United States Patent
Zhang et al.

(10) Patent No.: US 10,644,528 B2
(45) Date of Patent: May 5, 2020

(54) MULTIPLE-ORIENTATION WIRELESS CHARGING

(71) Applicant: Avago Technologies International Sales Pte. Limited, Singapore (SG)

(72) Inventors: Zhuohui Zhang, Santa Ana, CA (US); John Stuart Walley, Ladera Ranch, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/954,236

(22) Filed: Apr. 16, 2018

(65) Prior Publication Data

US 2018/0233941 A1 Aug. 16, 2018

Related U.S. Application Data

(63) Continuation of application No. 14/871,074, filed on Sep. 30, 2015, now Pat. No. 9,948,131.

(60) Provisional application No. 62/148,352, filed on Apr. 16, 2015.

(51) Int. Cl.
*H02J 7/00* (2006.01)
*H02J 7/02* (2016.01)
*H02J 50/10* (2016.01)

(52) U.S. Cl.
CPC .............. *H02J 7/025* (2013.01); *H02J 50/10* (2016.02); *H02J 7/0027* (2013.01); *H02J 7/0042* (2013.01)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

| | | | |
|---|---|---|---|
| 2011/0031928 A1* | 2/2011 | Soar | F41G 1/34 320/108 |
| 2011/0193421 A1 | 8/2011 | Urano | |
| 2012/0280765 A1 | 11/2012 | Kurs et al. | |
| 2014/0333151 A1* | 11/2014 | Matsui | H02J 5/005 307/104 |

OTHER PUBLICATIONS

Non-Final Office Action for U.S. Appl. No. 14/871,074, dated Jun. 5, 2017, 11 pages.

* cited by examiner

*Primary Examiner* — Arun C Williams
(74) *Attorney, Agent, or Firm* — Foley & Lardner LLP

(57) ABSTRACT

A system includes a charging station and one or more receiving devices receiving wireless power from the charging station. The charging station includes an orientation adaptable antenna (OAA). The OAA may generate a magnetic field component parallel to the plane of the OAA to charge devices oriented at 90 degrees with respect to the OAA. The OAA may generate a magnetic field along different directions within the plane parallel to the OAA. The OAA may be able to adjust the direction of the field to couple to devices with antennas in different orientations. The OAA may further produce a magnetic field normal to the plane of the OAA. The OAA may adjust the relative strengths the various directional components of the magnetic field to align the field normal to the antennas of the receiving devices in up to three dimensions, simultaneously charge receiving devices in different orientations, or both.

23 Claims, 10 Drawing Sheets

MULTIPLE-ORIENTATION WIRELESS CHARGING

CROSS-REFERENCE TO RELATED APPLICATIONS

This application is a continuation of and claims priority to and the benefit of U.S. patent application Ser. No. 14/871,074, filed Sep. 30, 2015, which claims the benefit of and priority to U.S. Provisional Application No. 62/148,352, filed Apr. 16, 2015, the contents of which are hereby incorporated herein by reference in their entirety for all purposes.

TECHNICAL FIELD

This disclosure relates to providing power wirelessly for multiple device orientations.

BACKGROUND

Rapid advances in electronics and communication technologies, driven by immense customer demand, have resulted in the widespread adoption of mobile communication devices. Many of these devices, e.g., smartphones, have sophisticated processing capability and rely on clocks of different frequencies to perform different processing tasks, e.g., decoding and playback of encoded audio files. These devices may rely on portable power sources that are periodically charged. The ease and speed of the charging process may contribute to the commercial success of the device.

DETAILED DESCRIPTION

The techniques and architectures discussed below facilitate wireless power provision for devices in many different orientations relative to the charging station. For example, the antenna plane of the charging antenna coil of the receiving device (the device which is wirelessly charging) may be oriented orthogonal to the antenna plane of the charging station. In the example, the receiving device may couple more efficiently to a magnetic field parallel to the antenna plane of the charging station than to a magnetic field normal to the charging station.

The charging station may also charge devices with antennas oriented parallel, orthogonal, or at other angles with respect to the antenna plane of the charging station. In the regard, the charging station may generate magnetic fields that run parallel to the antenna plane, orthogonal to the antenna plane, or at any other angle via a super-position of magnetic fields at different orientations using an orientation adaptable antenna (OAA). The charging station may implement the OAA via arrays of conductor traces, an antenna coil, magnetic shielding layers, or any combination thereof.

The charging station may be configured to adjust the generated field to account for rotation of devices oriented, at least in part, in a plane that is orthogonal to the antenna plane of the charging device.

In some cases the coupling coefficient and current usage of the charging station may affect the performance of the charging station. For example, the coupling coefficient and current usage may affect the efficiency of power transfer. In an example scenario where the charging station is generating magnetic fields parallel to its antenna plane, the charging station may demonstrate higher efficiencies with a hybrid class power amplifier (HCPA) that with class D or class E power amplifiers. The HCPA may be driven in a signal ended circuit configuration or a double ended circuit configuration.

Figure 1:
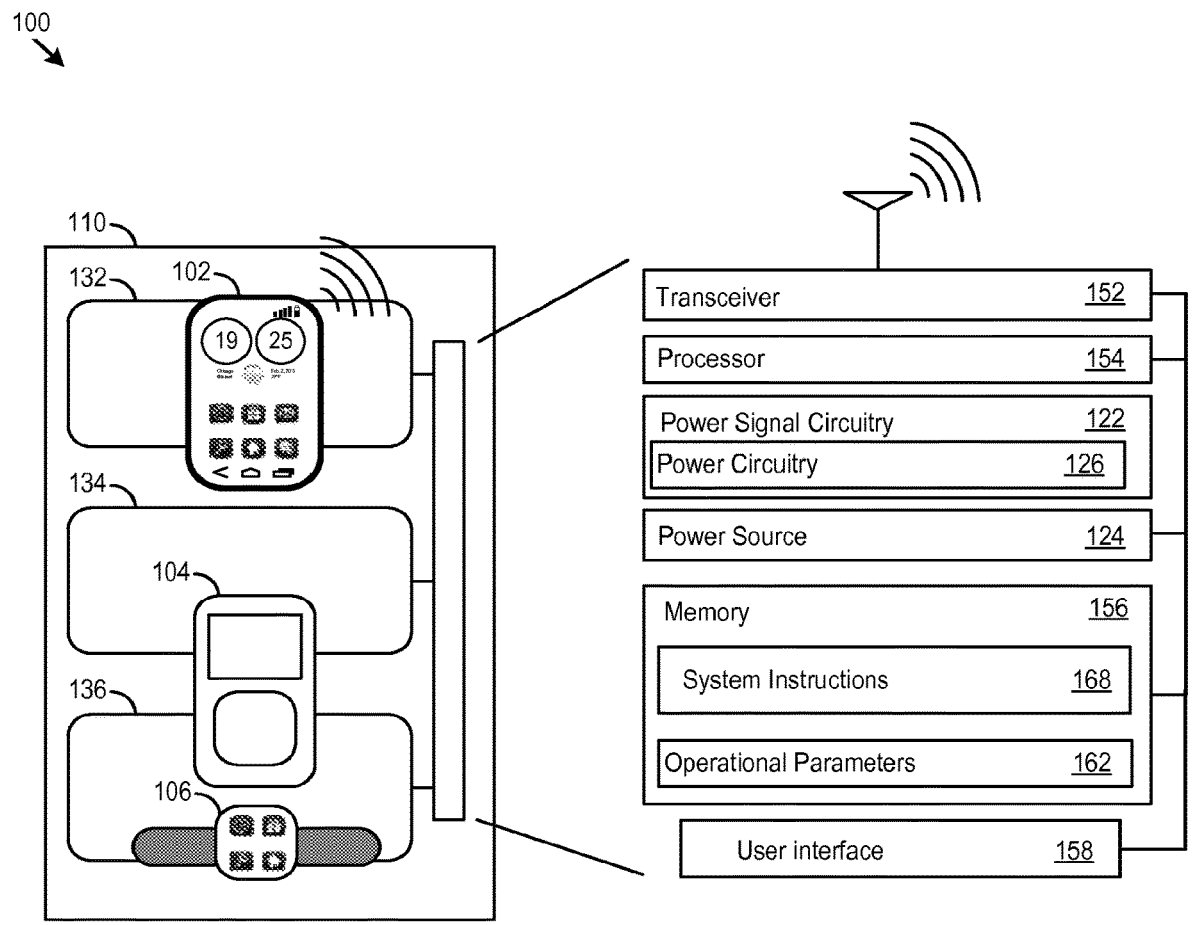
FIG. 1 shows an example wireless power environment.

FIG. 1 shows an example wireless power environment 100. The wireless power environment 100 includes portable devices 102 and 104, wearable devices 106, and a charging station (CS) 110. The wireless power environment 100 may include any number or type of devices. For example, Internet of Things (IoT) devices, such as building automation monitoring or control devices, home appliances, or any other device may be charged or provided with operational power in the wireless power environment 100. The techniques described below regarding wireless power may be implemented in virtually any wireless power scenario. For example, the devices 102-106 receiving the wireless power may charge a battery, capacitor, or other energy storage subsystem. Additionally or alternatively, the devices 102-106 may obtain the power needed for normal operation directly from the power received from the CS 110.

The CS 110 may include power signal circuitry (PSC) 122 configured to selectively supply a power signal to any number of transmit coils, such as the transmit coils 132, 134, and 136. The transmit coils 132-136 transmit the power signals to the portable devices 102. The CS 110 may include a power source 124 configured to support generation of the transmitted power signals. The PSC 122 may convert a source signal from the power source 124 into a form that the antenna may transmit. For example, the source signal from the power source may provide a direct current (DC) or alternating current (AC) signal. The PSC 122 may include power circuitry 126 which may tune the source signal from the power source 124 to a particular frequency or signal level for transmission via one or more of the transmit coils 132-136 to the devices 102.

In various implementations, the CS 110 may include a transceiver 152 to support RF communication, one or more processors 154 to support execution of instructions, e.g., in the form of programs, and carry out operation of the CS 110. The CS 110 may include memory 156 for execution support and storage of system instructions 168 and operation parameters 162. In some implementations, the transceiver elements may receive status and/or control signals from the portable devices 102 and/or wearable devices 106. In some implementations, the CS 110 may use control and/or status signals to adjust power signal parameters and/or other wireless power provisional strategies. For example, the signals may allow for detection of new devices within the power signal range, determination of when a device in range has completed charging, and/or other status or control determinations. For example, a device 102 may in communication with the CS 110 over a wireless protocol, e.g. Bluetooth, Wi-Fi or other wireless protocol via transceiver 152. Additionally or alternatively, the CS 110 may monitor internal parameters for status determination. For example, the load of any of the transmit coils 132-136 may be monitored to determine the presence/absence of devices within power signal range. For example, monitoring of internal parameters may be used by the CS 110 to support charging of a device 104 which may not be in data communication with the CS 110. The communication device may include a user interface 158 to facilitate for user operation of the device.

In some implementations, the physical realization of the CS 110 may include non-planar surfaces. For example, bowl-shaped stations, semispherical stations, pyramidal stations, or other CS shapes may be used. In some cases, a planar antenna design may be mapped on to the surface topology of a non-planar CS. The resultant mapping may be used to fashion a physical non-planar antenna on the surface of the non-planar CS.

Figure 2:
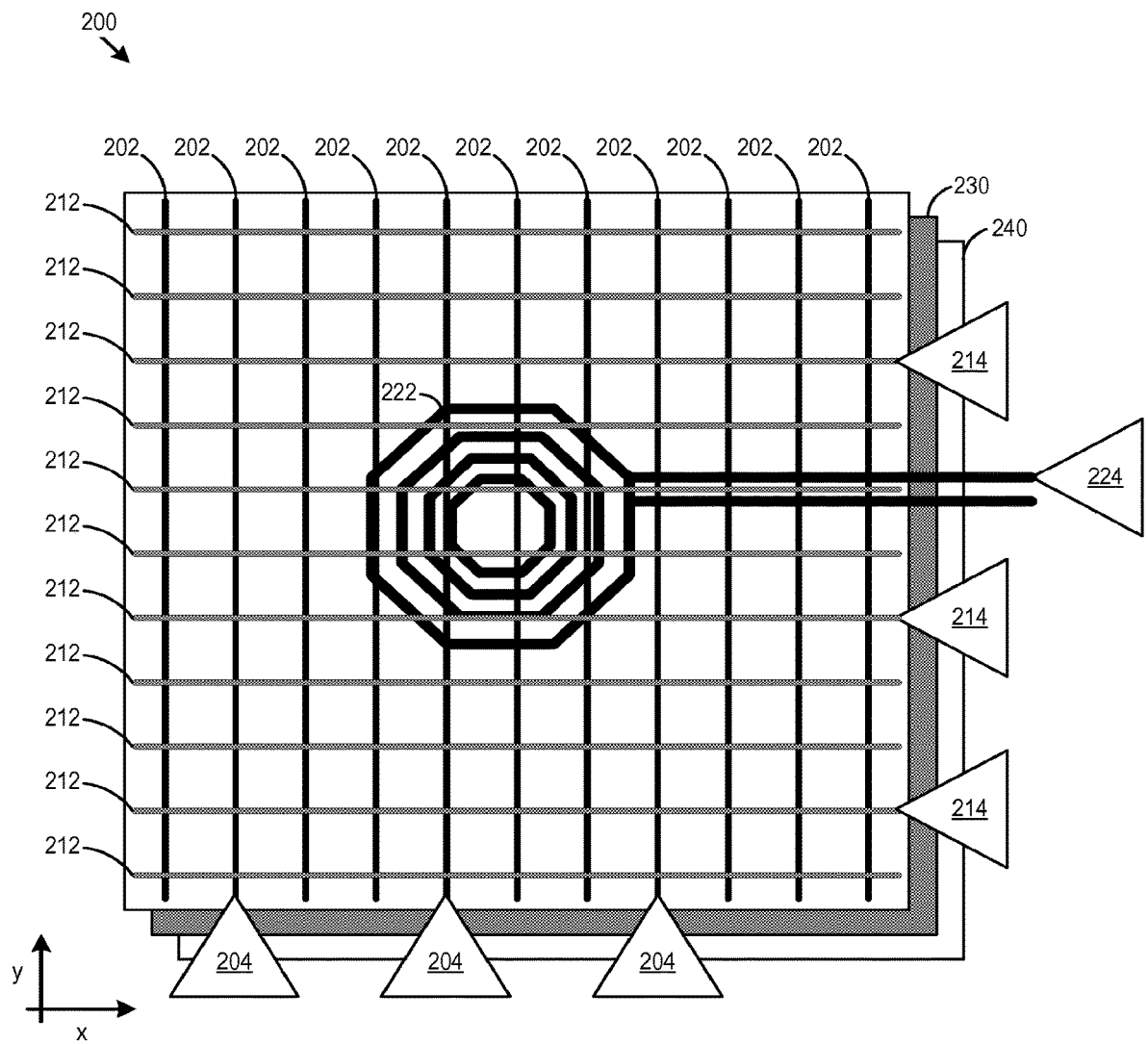
FIG. 2 shows an example orientation adaptable antenna (OAA).

FIG. 2 shows an example OAA 200. The example OAA 200 may include an array of traces 202, which may be metal traces, wires, or other conductors. The OAA 200 may include one or more drivers 204 to send current through the traces 202. When current runs through the traces 202, the traces generate a magnetic field. In the example OAA 200, the traces 202 are disposed in parallel along the y-axis.

In some implementations, the traces 202 may be driven by amplifier circuitry to generate a magnetic field that runs along the y-axis. The traces 202 may be driven coherently by the driver 204 to generate a magnetic field in the x-direction. Other field components (e.g., y-axis, z-axis field components) may be coherently cancelled by the superposition of the fields of the traces 202. In some cases, y-axis and z-axis components may not necessarily be fully cancelled by the super-positioning, which may allow coupling for devices with antennas oriented in these directions, e.g., oriented wholly or partially along the y-axis or z-axis. For example, non-x-axis fields may be generated at the edges of the array formed by the traces 202. Additionally or alternatively, non-x-axis fields may be generated by traces that are curved, not completely parallel, or in other configurations. The designation of x, y, and z axes are relative designations which may be referenced to the plane of the OAA, or defined in other ways. The CS 110 drives the traces 202 to perform cancellation and coherent addition of magnetic field components to generate a total magnetic field (e.g., the resultant magnetic field after when the contributions from the traces are accounted for) that may be oriented in a selectable direction.

Other coordinate systems may be used to describe the fields generated by the system, e.g., polar coordinates, spherical coordinates, or other 3-dimensional representations.

Additionally or alternatively, the example OAA 200 may include traces 212 oriented along the x-axis. These traces may produce a magnetic field component along the y-axis. The traces 212 may be driven by one or more drivers 214.

When a device enters the charging field generated by the OAA 200, the device may not necessarily be fully aligned with the y-axis or the x-axis. The OAA 200 may adjust the relative driving levels of the traces 202 to the traces 212 to generate a total magnetic field aligned with the antenna plane of the charging antenna coil, for example, aligned normal to the charging antenna coil.

In some cases, the x-axis traces 212 and the y-axis traces 202 may be driven independently, such that their fields super-position with little coherent interaction. Thus, the relative directional components of the magnetic field may be balanced independently to match the orientation of the device.

Additionally or alternatively, the x-axis traces 212 and the y-axis traces 202 may be driven by the CS 100 coherently with one another to effect beam steering and focus of the magnetic field. Thus, coupling may be directionally aligned by the CS 110 with the device and the distribution across the OAA of the field may be adjusted such that the field is concentrated at the position of the device or devices charging on the CS 110.

Additionally or alternatively, an antenna coil 222 may be included in the OAA 200. The antenna coil 222 may generate a z-axis field, e.g. normal to the page. The antenna coil 222 may be driven by one or more drivers 224. The antenna coil 222 may surround the edges of the traces 212, 202 (e.g., may include coil elements outside the traces 202 and 212) or may be disposed within the grid defined by the traces 212, 202.

The relative driving of the x, y, and z axis magnetic field components by the two sets of traces 202 and 212, and/or the coil 222 may be used by the CS 110 to align the magnetic field with the charging coil of the receiving device in three dimensions (e.g., yaw, pitch, and roll).

Additionally or alternatively, the multiple-axis magnetic-field components may be used to align the field to charge multiple devices aligned to various planes. For example, a smartphone or tablet may lay flat on the OAA and couple well to z-axis field components. A wearable, such as a watch, may have a wristband propping the wearable in an orientation about 90 degrees to the OAA. Thus, the traces 202, 212 may be used by the CS 110 to generate a magnetic field parallel to the plane of the OAA to charge the wearable. The coil 222 may be used by the CS 110 to generate a magnetic field normal to the OAA to charge the smartphone, tablet, or other mobile device.

The trace 202, 212, and coil 222 may be separated by insulation, so that they may be overlapped without direct electrical coupling.

A CS 110 that includes an OAA 200 may establish a data communication link with a charging device over the transceiver 152. Using the data communication link the CS 110 may form a feedback loop with the charging device. The PSC 122 of the CS 110 may cause the drivers 204, 214, 224 to adjust their current levels to vary the field direction or distribution until a desired charging level is achieved. In some cases, the feedback loop may be used to perform a search for a maximum for charging efficiency, (e.g., ratio of charging level to energy consumed by the OAA).

In an example scenario, the CS 110 may establish a data link with the charging device, e.g., via Wi-Fi, Bluetooth, radio frequency identification (RFID), near-field communication (NFC), a personal area network, or other wireless link. The charging device may send data frames to the CS 110. The data frame may include status messages with indicators that allow the CS 110 to determine the charging status of the charging device. The charging status may include battery levels or other charging progress indicators; an indicator of charging rate, such as a current level in the charging device driven by the generated magnetic field; or other charging indicators. In some cases, a specific protocol may be implemented by the CS 110 and the charging device where the orientation of the generated magnetic field may be varied to find a peak value in the driven current in the charging device or to obtain a driven current above a threshold value. The charging device may indicate when charging completes by sending completion data frame over the data link.

In some implementations, the charging device and the CS 110 may exchange positioning data, such as location, orientation, or alignment. For example, the charging device may send global positioning information, such as, compass readings, magnetometer readings, accelerometer readings, global positioning system readings or other positioning data. Additionally or alternatively, relative positioning data may be exchanged. For example multi-antenna charging devices and multi-antenna charging stations may use triangulation or beam steering to determine the relative position (e.g., location, orientation, alignment) of the charging device to the CS 110. Charging devices and the CS 110 may also use, radar, laser ranging, time of flight measurements, or other ranging schemes of determine the relative positions of the charging device to the CS 110. Charging devices and the CS 110 may also use a line of sight analysis of orientation markers, such as, radio emitters, infrared emitters or reflective surfaces, to determine the relative orientation or alignment of the charging device to the CS 110.

In some cases, the driver 204, 214, 224 may be separate drivers or driver groups. However, the traces 202, 212 and coil 222 may be daisy chained or otherwise electrically coupled to operate using a single driver or single driver group.

In some cases, load sensing may be used by the CS 110 to select the relative driving for the field components. The coupling between the charging antenna and the components of the OAA 200 (e.g., the traces 212, 202, and coil 222) may affect the load on experience by drivers of these components. Applying load sensing schemes (resistivity measurements, r-sense, current measurements, or other load measurements) may allow the PSC 122 to determine the relative coupling for each of the antenna components and to adjust the driving levels accordingly.

The traces 202, 212 may be driven coherently by the CS 110. The coherent driving may be achieved by multiple phase-locked drivers. For example, the traces may be driven by a group of drivers locked to the same clock signal with defined offsets based on their effective distance (e.g., a function of distance and the dielectric constant of the transmission material) from the signal source.

However, the traces 202, 212 may be daisy chained to be driven using a single driver for multiple traces. In some implementations, return current traces may be used to pass current between individual ones of the traces 202, 212 to complete the daisy chain. The return current traces may be disposed on a return current layer 240. The return current layer 240 may be separated from the layers containing the traces 202, 212 by a shielding layer 230. Thus, the contribution to the field by the return current traces may be blocked by the shielding layer 230.

Figure 3:
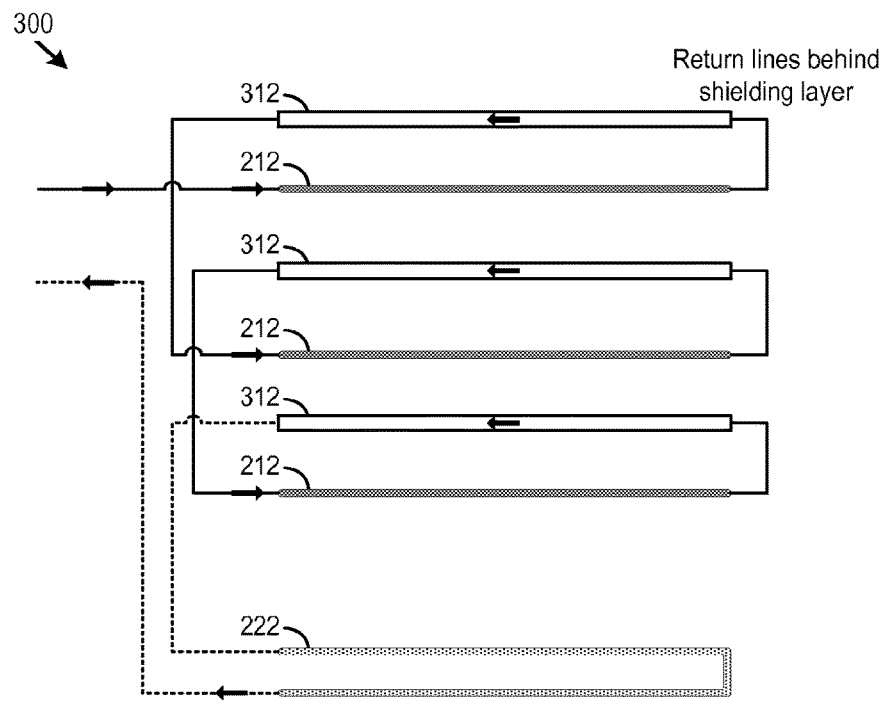
FIG. 3 shows example daisy chaining circuitry.
Figure 3:
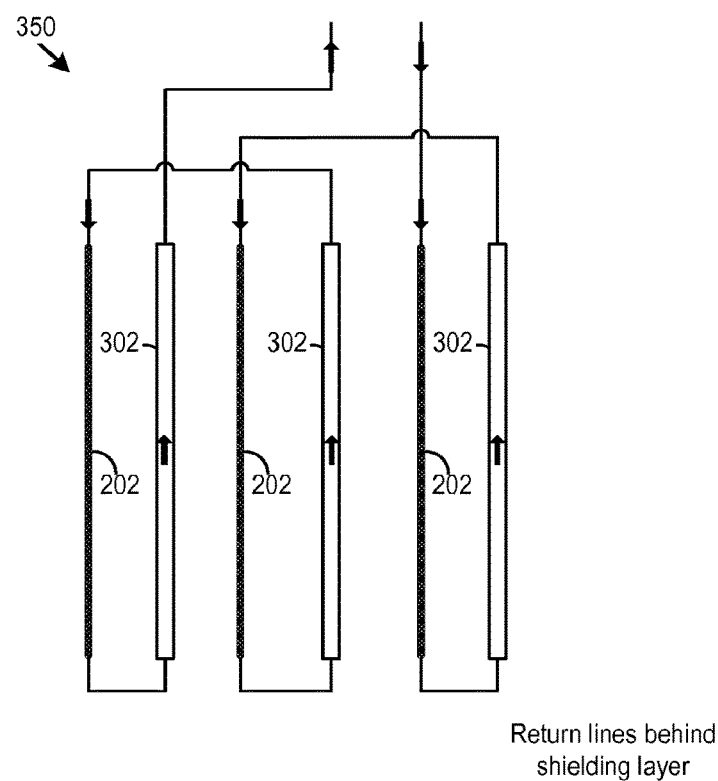

Moving now to FIG. 3, example daisy chaining circuitry 300, 350 is shown. The individual traces 202, 212 are paired with return traces 302, 312. The effective length of the individual return traces 302, 312 may be matched to the effective length of the traces 202, 212. Thus, the phase evolution across the individual traces 202, 212 may be undone when the current traverses the return traces 302, 312. Hence, the phase at the start of the individual traces 202, 212 may be matched for the daisy chained traces.

The return traces 302, 312 may create a symmetric field opposite to the traces 202, 212. In some implementations, a shielding layer, e.g., a ferrite layer or other shielding material, may be placed between the layer including the traces and the layer including the return traces. For example, this may prevent the field from the return traces 302, 312 coupling the field from the 202, 212.

In the example daisy chaining circuitry 300, the coil 222 is daisy chained to the traces 212. However, in some cases, traces 212 may be daisy chained and coil 222 may be driven independently. Further, in some cases, traces 202 and traces 212 may be daisy chained to one another. For example, daisy chaining circuity 300 may be output coupled to daisy chaining circuitry 350. Virtually any combination of daisy chaining may be used.

Different patterns of traces may be daisy chained. For example, alternating traces, e.g., every other trace or every 'n' traces, may be daisy chained allowing for multiple drivers to control a group of interleaved traces. This may allow an additional degree of freedom in directing and distributing the magnetic field.

In some cases, the OAA 200 may make-up a macroblock in a tiled-array of multiple OAAs. The tiled-array may implement charging device presence detection as discussed above to determine which ones of the multiple OAA tiles are wirelessly coupled to an actively charging device. In some cases, the OAA tiles that are wirelessly coupled to actively charging devices may be activated while non-coupled tiles may be powered down. Thus, the tiled-array of OAAs may be scaled up in capacity to handle multiple device charging, and may be scaled down to achieve efficient single/few device charging without active excess charging capacity consuming power resources.

Figure 4:
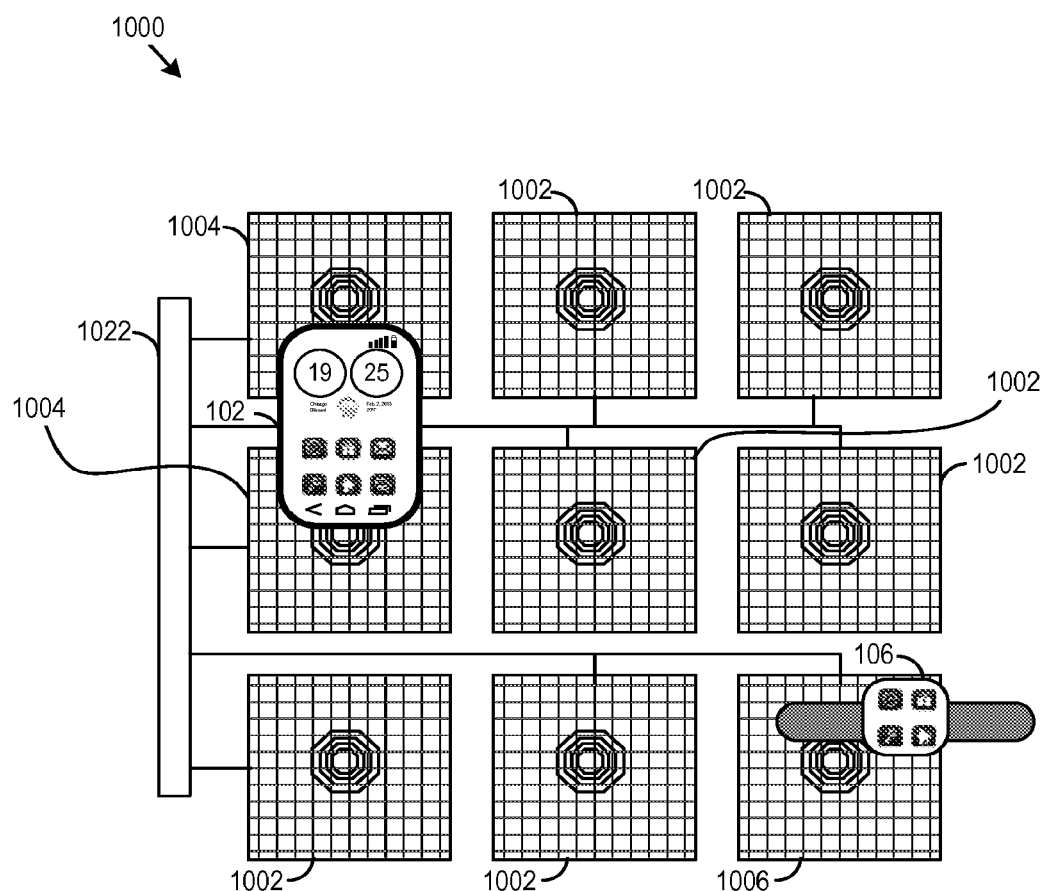
FIG. 4 shows an example macroblock tiled array.

FIG. 4 shows an example macroblock 1002, 1004, 1006 tiled array 1000. The power signal circuitry 1022 may determine the presence of the charging devices within the signal range of the macroblocks 1004, 1006. The macroblocks 1002 without devices in their signal range may be powered down by the power signal circuitry 1022. For example, when the power signal circuitry 1022 performs presence detection for a macroblock 1002 and receives a negative result, the power signal circuitry may power down the macroblock 1002. In some cases, a single device 102 may be in the range of multiple macroblocks 1004. Additionally or alternatively a device 106 may be within the signal range of a single macroblock 1006.

When a device is within the signal range of multiple macroblocks 1004. The power signal circuitry may coordinate the driving signals sent to the macroblocks 1004 to avoid interference among the macroblock signals. For example, the power signal circuitry may drive the macroblocks 1004 coherently. Additionally or alternatively, the power signal circuitry may select a single one or some subset of the group to charge the device 102. In some systems, coordination of macroblocks may be implemented by the powers signal circuitry 1022 whenever two neighboring macroblocks are active. For example, the power signal circuitry 1022 may coordinate neighboring macroblocks when the neighboring macroblocks are charging different devices or the same device.

The macroblocks 1002, 1004, 1006 are shown in a tiled array 1000 with spacing between the individual macroblocks other inter-macroblock spacings may be implemented. Further, in some implementations, contiguous macroblocks may make up the tiled array 1000.

Figure 5:
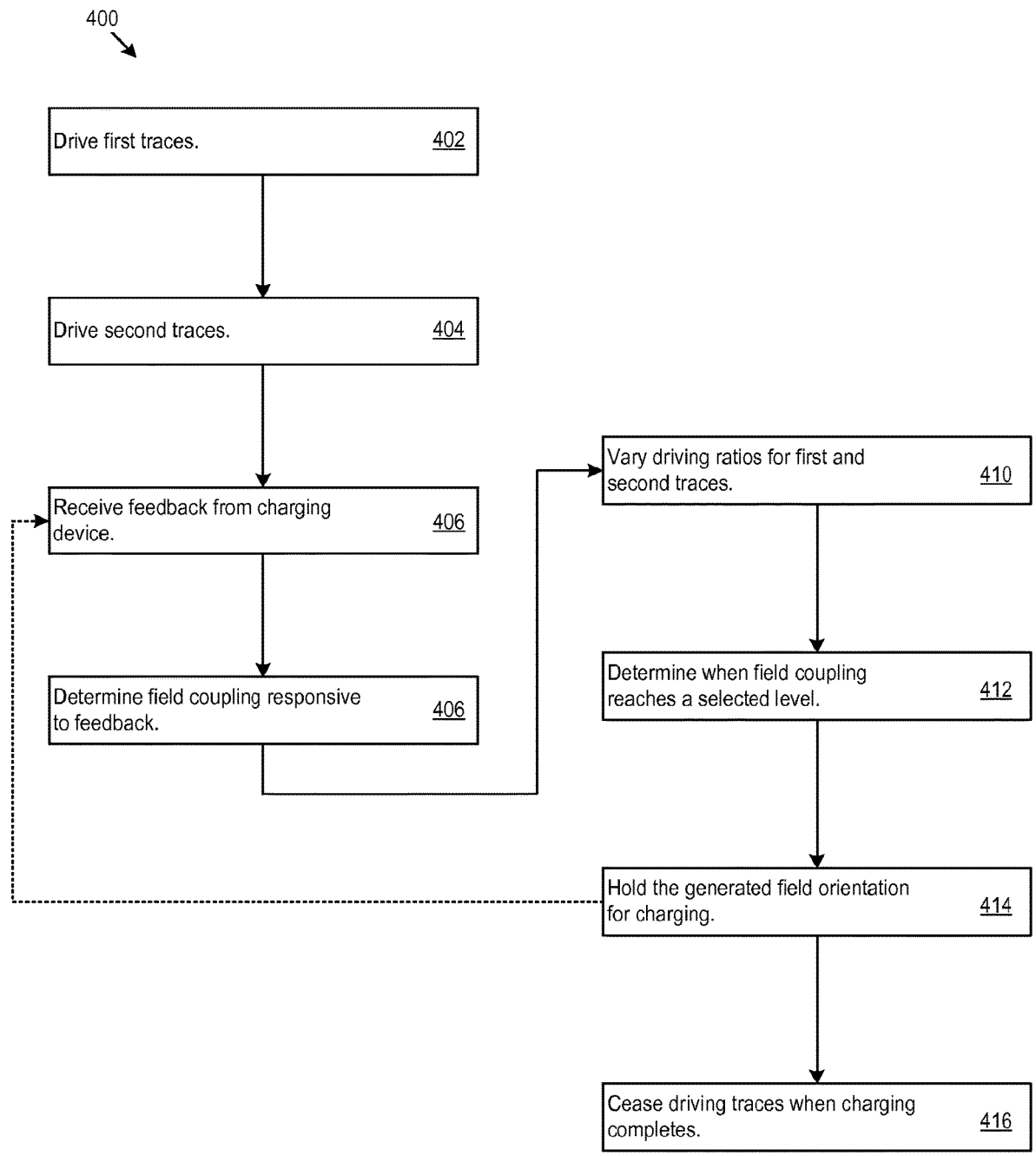
FIG. 5 shows example power signal logic.

FIG. 5 shows an example of power signal logic 400 that the CS 110 may implement in its circuitry. The power signal logic 400 may control the power signal level used to drive an OAA. Further, the power signal logic 400 control driving signal ratios among the traces to control the direction of the generated magnetic field. The power signal logic 400 may drive a first trace or group of traces to generate a magnetic field (402). The generated magnetic field may have one or more directional components. The power signal logic 400 may drive a second trace or group of traces to generate additional field components (404). In some cases, the additional field components may combine additively or subtractively with the field components from the first trace, as discussed above, to generate a magnetic field in a selectable orientation.

The power signal logic 400 may receive feedback from a charging device (406). For example, the power signal logic 400 may receive a field coupling indicator over a data channel established between the CS 110 and the charging device. Additionally or alternatively, the power signal logic may determine the coupling level based on the antenna load imparted as feedback on the OAA by the charging device. The power signal logic 400 may determine a field coupling level for the charging device responsive to the feedback (408). The power signal logic 400 may vary the driving ratios between the first and second traces to determine whether the field coupling for charging device can be increased by changing the field orientation, e.g., via the driving ratios between the first and second traces (410). The power signal logic 400 may determine when the field coupling has reached a selected level (412). For example, the power signal logic 400 may determine when a peak field coupling is reached, or find a field orientation that produces a field coupling above a selected threshold. The power signal logic 400 may hold the generated field orientation while charging the charging device (414). The power signal logic 400 may also monitor the feedback to determine field coupling level changes during charging (406). For example, the orientation of the charging device may be changed during charging. The power signal logic 400 may cease driving the traces when charging completes (416). For example, charging may complete when the charging device is removed from the CS 110 or when the charging device sends feedback indicating that a selected charge threshold has been reached, e.g., a target battery state or energy level.

Figure 6:
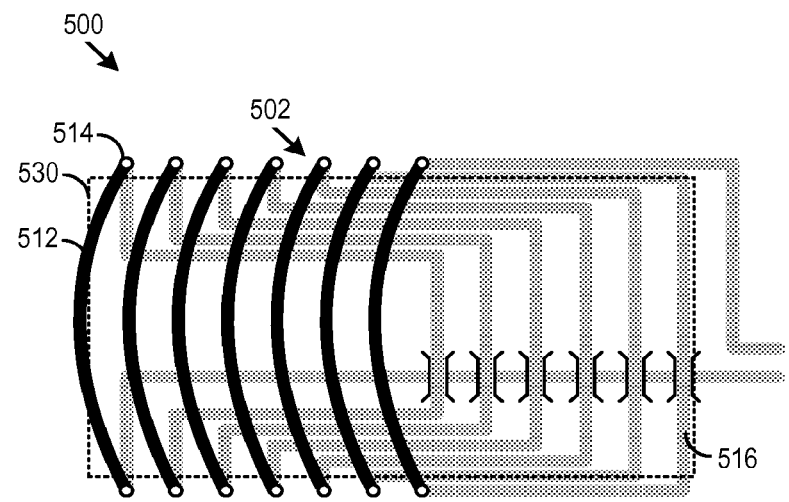
FIG. 6 shows a second example OAA.
Figure 6:
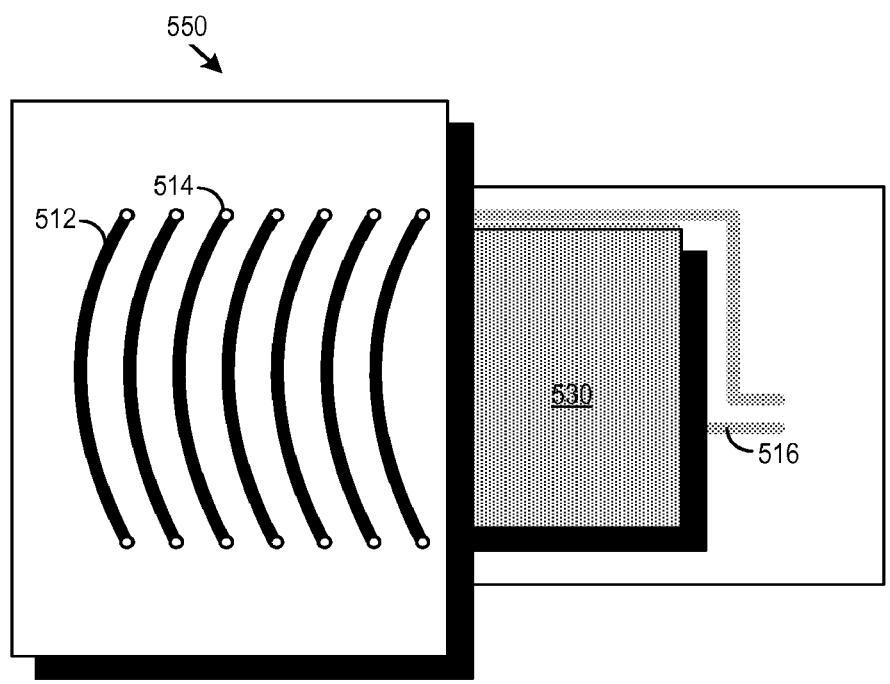

Other OAA designs may be used to generate a directed field parallel to the antenna plane. FIG. 6 shows views 500, 550 of a second example OAA. The second example OAA includes an antenna coil 502. The antenna coil includes curved traces 512 that generate a field component parallel to the coil 502. The curved traces 512 are interconnected with the lower layer traces 516 of the coil 502 by multi-layer interconnects 514. The curvature of the curved traces 512 also creates parallel field components in multiple directions along the plane of the OAA. Thus, a device oriented 90 degrees from the OAA may charge in a range of orientations. The coil 502 may also produce a field normal to the OAA plane. Thus, devices aligned parallel to the OAA may also be charged. The ratio of the parallel field strength to the normal field strength for the coil 502 may be adjusted based on the placement and thickness of the shielding layer 530. In some implementations, a ferrite shielding layer may be used. Two views 500, 550 of the second example OAA are shown. The first view 500 shows a transparent layer view showing the full example antenna coil 502. The second view 550 shows the shielding layer 530 disposed between the curved traces 512 and the lower layer traces 516.

In an example scenario with ferrite shielding, the second example OAA was implemented to create a field where the ratio of the normal to the parallel component (e.g., Hz/Hy) was 1.4. The system concurrently demonstrated a quality factor (Q) of 210. However, other configurations are possible.

Figure 7:
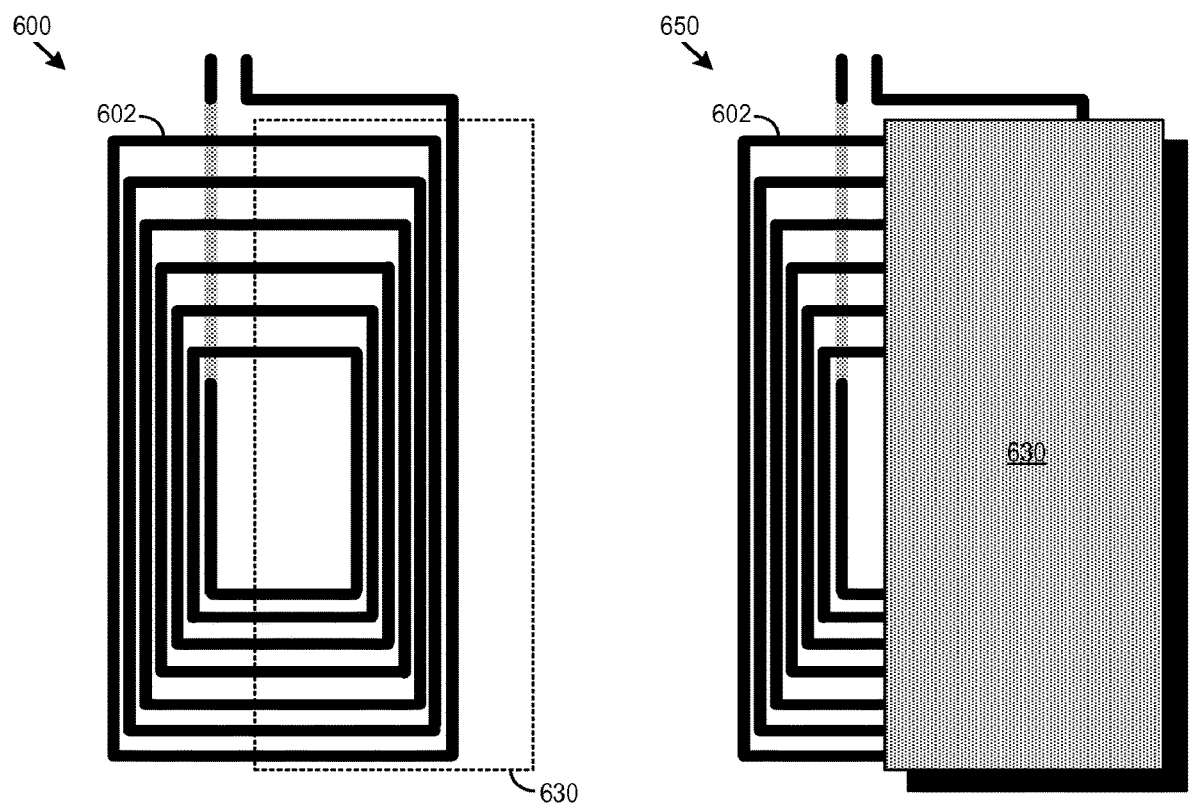
FIG. 7 shows a third example OAA.

FIG. 7 shows views 600, 650 a third example OAA. The third example OAA includes a rectangular coil 602. A shield 630 may be used with the third example OAA. The rectangular coil produces a normal field component and parallel field components. Different shield thickness may be used. In the example, the shield is used to cover half the coil area. However, other positioning may be used. For example, a triangular shield may be used to cover coils such that the current in the exposed coils travels only one direction for each of the x and y axes. Two views 600, 650 of the third example OAA are shown. The first view 600 shows a transparent shielding layer 630 view showing the full example rectangular coil 602. The second view 650 shows the shielding layer 630 covering a portion of the rectangular coil 602.

Table 1 shows the ratios of the normal field component to the x and y components for varying shield thicknesses and materials for the third example OAA. Q values are also shown.

TABLE 1

| Ratio of normal field component to parallel field components. | | | |
|---|---|---|---|
| Shield (thickness) | Hz/Hx | Hz/Hy | Q |
| No Ferrite | 2.11 | 1.61 | 158 |
| Ferrite (0.2 mm) | 1.87 | 1.59 | 158 |
| Ferrite (0.4 mm) | 1.81 | 1.56 | 156 |
| Ferrite/Metal (0.2 mm) | 1.90 | 1.64 | 148 |

Figure 8:
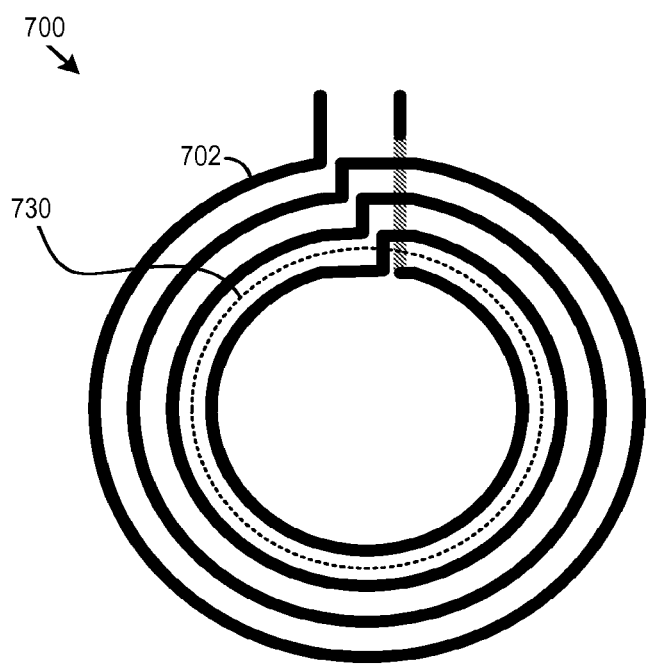
FIG. 8 shows a fourth example OAA.
Figure 8:
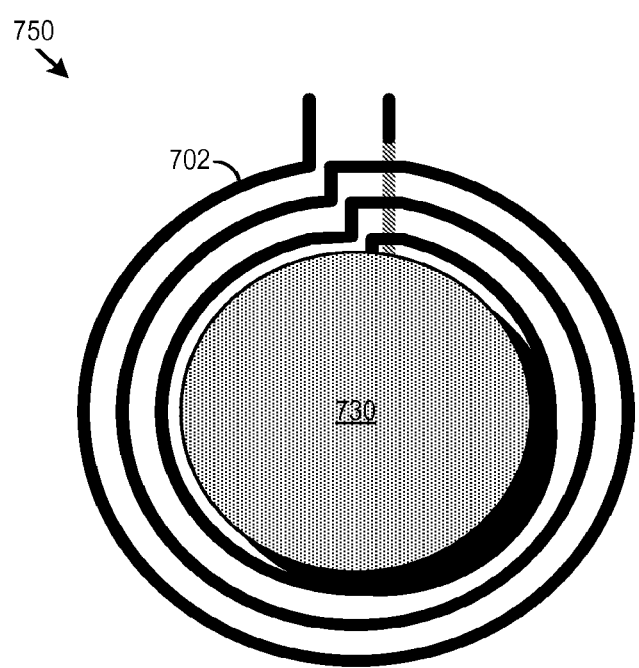

Moving now to FIG. 8, views 700, 750 a fourth example OAA is shown. The fourth example OAA includes a circular coil 702. A shield 730 may be used with the fourth example OAA. The circular coil 702 produces a normal field component and parallel field components. A shield 730 may be used to adjust the ratio of the normal field component to the parallel field component. Two views 700, 750 of the third example OAA are shown. The first view 700 shows a transparent shielding layer 730 view showing the full example circular coil 702. The second view 750 shows the shielding layer 730 covering a portion of the circular coil 702.

In an example scenario a five turn circular coil of varying radius is used with a 50 mm radius ferrite shield. Table 2 show ratios of the normal field component to the y component for varying coil width for the example. Q values are also shown.

TABLE 2

| Ratio of normal field component to parallel field component. | | |
|---|---|---|
| Coil Radius (mm) | Hz/Hy | Q |
| 5 | 1.69 | 267 |
| 10 | 1.63 | 259 |
| 15 | 1.51 | 240 |
| 20 | 1.36 | 143 |
| 25 | 1.24 | 133 |
| 30 | 1.19 | 124 |

Figure 9:
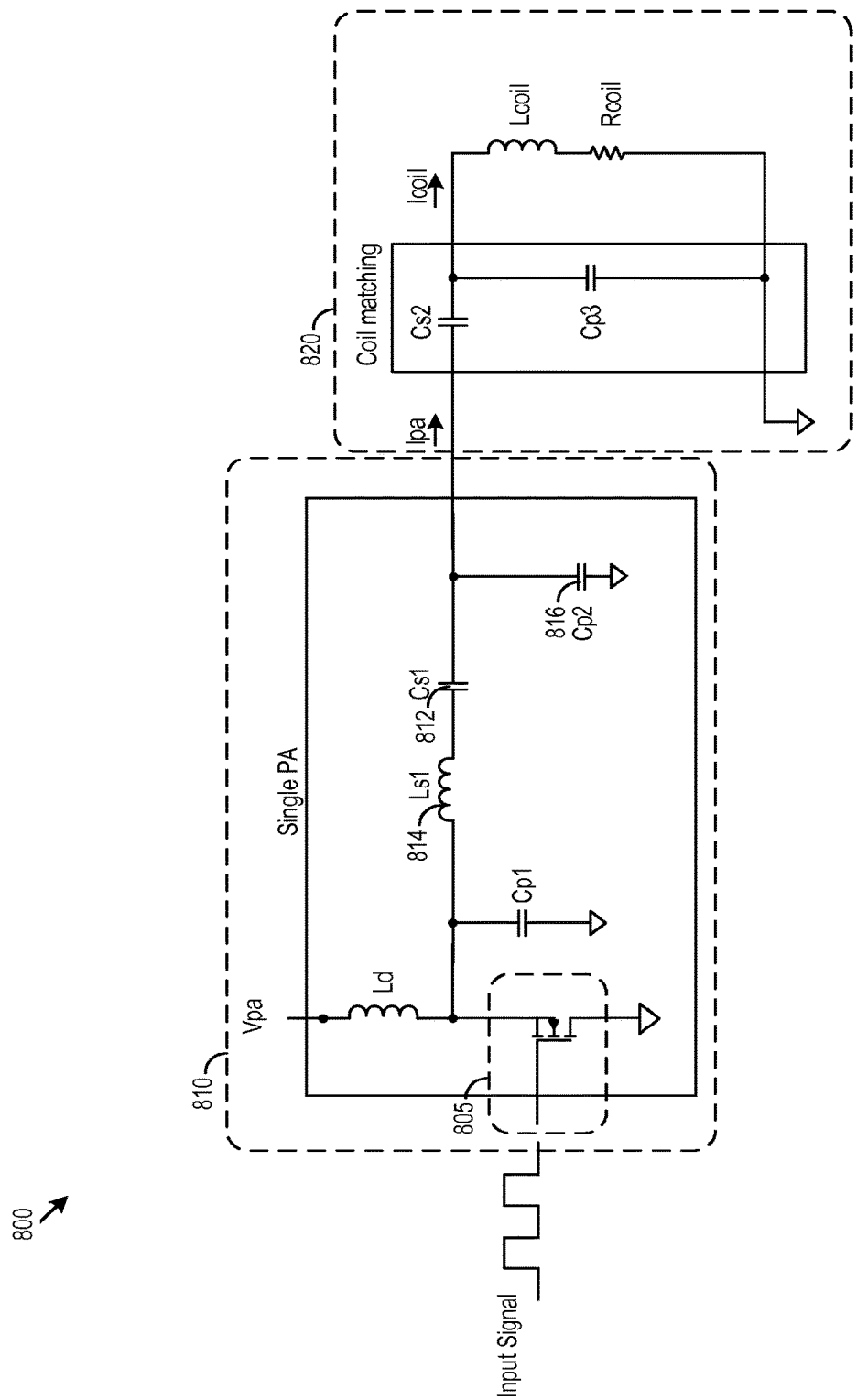
FIG. 9 shows an example hybrid class power amplifier (HCPA).

FIG. 9 shows an example HCPA 800. The HCPA 800 may be by the CS 110 to supply a stable driving current to an OAA. The HCPA includes single-ended driving circuitry 805. The hybrid class of the HCPA 800 may allow currents of up to 1 A or more to be circulated through the OAA 200 while holding the current level stable. In some cases, for a power amplifier voltage (Vpa) of 10 V a target current of 1 A may be supplied.

The power amplifier circuitry 810 may be similar to a class E power amplifier. For example, the power amplifier circuitry may include capacitor Cs1 812, inductor Ls1 814, which may be present in class E power amplifier designs. Additionally or alternatively, the power amplifier circuitry

810 may include capacitor Cp2 816, which may be present in class D amplifier designs but not necessarily present in class E amplifier designs. The power amplifier circuitry 810 may further couple to coil matching circuitry 820, which may allow for adjustment of the current flow to adapt to changing antenna impedance conditions. In some cases, Cs1 812 and Ls1 814 may be used to match the carrier frequency of the power signal. However, HCPA designs may also achieve carrier frequency tuning through adjustment of capacitor Cp2 816. Thus, Cs1 812 and Ls1 814 may be selected to match other parameters. For example, Cs1 812 and Ls1 814 may be selected for frequencies lower than the carrier frequency, modulation frequency, or another selected frequency characterizing the system. In some cases, tuning Cs1 812 and Ls1 814 to a frequency below the carrier may assist in stabilizing the output power level of the system. Thus, the system may resist changing it power level output when changes to the antenna impedance occur. Cs1 812 and Ls1 814 may be selected to allow for constant current over a wide range of coil load impedances. The inclusion of Cs1 812 and Ls1 814 selected for a low frequency resonance may also assist in mitigating the effects of electromagnetic interference.

In some implementations, the complex impedance of Cs1 812 and Ls1 814 may be matched (e.g., within a selected tolerance or approximately matched) to the complex conjugate of the impedance of Cp2 816. Further, in some systems, the roles of Ls1 814 and Cp2 816 may be inverted. For example, Ls1 814 may be used to achieve carrier frequency tuning, while Cp2 816 may be selected, along with Cs1 812, for low frequency. In some cases, Cs1 812 may be selected for fine impedance tuning and Ls1 814 may be selected for coarse impedance tuning.

Figure 10:
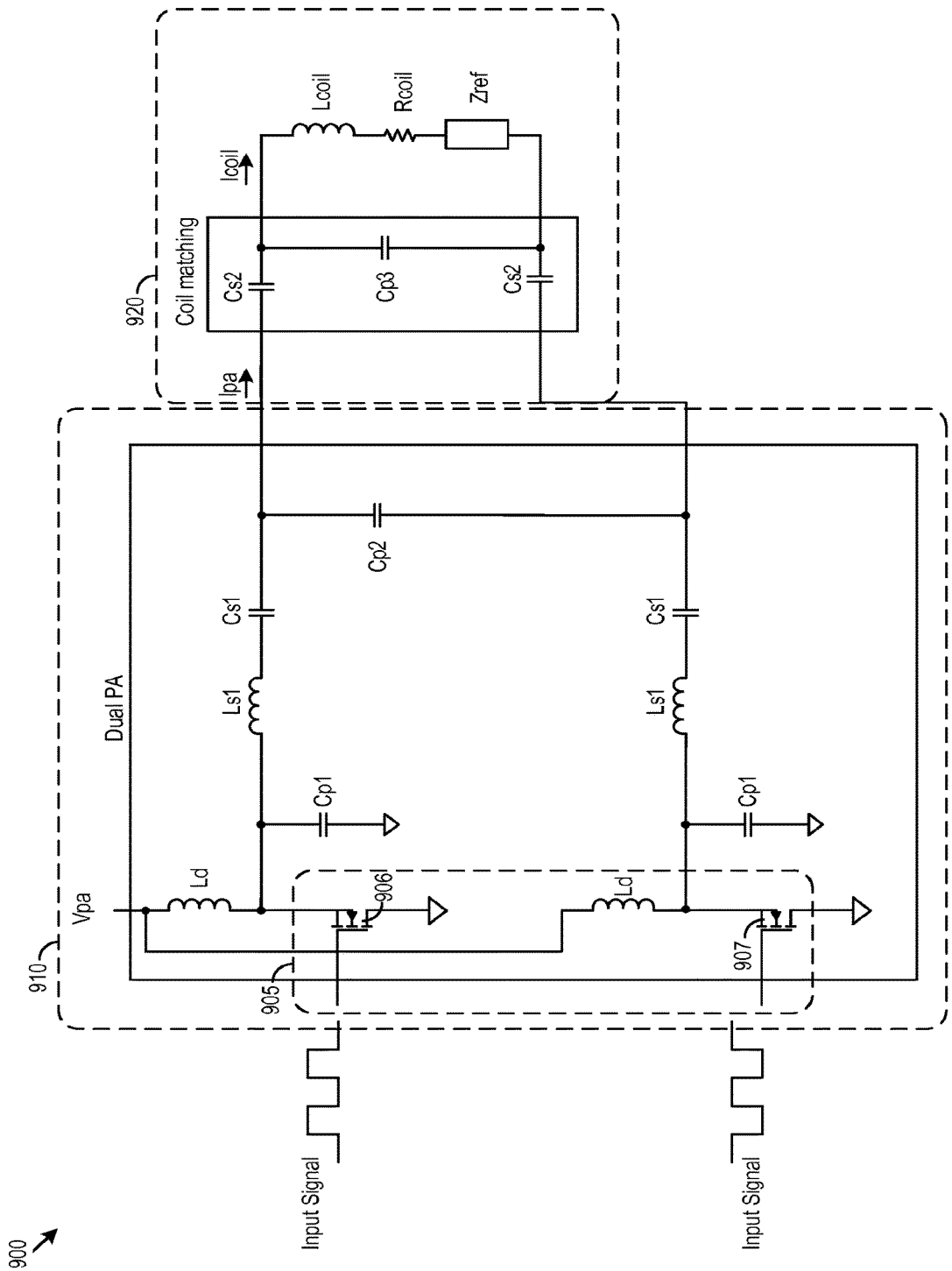
FIG. 10 shows a second example HCPA.

FIG. 10 shows a second example HCPA 900. The second example HCPA 900 includes double-ended driving circuitry 905. The power amplifier circuitry 910 may be similar to a class E power amplifier. The antenna load matching circuitry 920 may be similar to that of a class D amplifier.

In some cases, the HCPA 900 may be driven by pushing or pulling a current from a single one of the gates 906, 907. For example, a signal may be supplied to one gate, which drives current through the HCPA. Signal may exit the other gate, but the signal need not be supplied to the second gate.

The double-ended driving circuity 905 may allow for differential driving from input gates 906, 907. In some cases, the current level supplied by the HCPA may be adjusted by changing the relative phases of the driving signals on gates 906, 907. When two out-of-phase signals are combined a third signal at the frequency of the two signals is created. The amplitude of the third signal depends on the phase offset between the two input signals. In some cases, performance gains, e.g., stability, efficiency, or other performance metrics, may be achieved over systems that vary the driving current by adjusting Vpa.

In some cases, an HCPA circuit (e.g., 800, 900) may be implemented in wireless power transfer environments where the generated EM-field may hold more energy than used in some EM-fields used for signal transfer. To support the higher energy storage of the EM-field the HCPA circuits may drive a comparatively high current through the OAA. For example, the target current may be 1 A. In some cases, the coupling between the OAA and the charging device antenna may be low and the reflected impedance between the OAA and the charging device antenna may be low.

In some implementations, multiple power amplifier circuits (e.g., HCPA 800, 900, or other power amplifier circuits) may be stacked, e.g., in parallel or series, to generate a higher power output than could be created by any single one of the stacked power amplifier circuits. The individual stacked power amplifier circuitry may be activated or deactivated to adjust to increasing or decreasing charging loads. For example, when a device is removed, and thus, decoupled from the CS 110, one or more power amplifier circuits may be deactivated. When a device is added, power amplifier circuits may be activated.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. An apparatus comprising:
   an antenna configured to couple energy wirelessly to a charging device, the antenna comprising:
   a first trace, when driven, configured to generate one or more first magnetic field components in a first direction; and a second trace, when driven, configured to generate one or more second magnetic field components in a second direction, the one or more first magnetic field components and the one or more second magnetic field components resulting in a magnetic field in a third direction;

a communication interface configured to receive, from the charging device, a feedback indicating a field coupling between an antenna of the charging device and the magnetic field; and power signal (PS) circuitry configured to vary a driving ratio between the first trace and the second trace to adjust the third direction of the magnetic field responsive to the feedback indicating the field coupling between the antenna of the charging device and the magnetic field.

2. The apparatus of claim 1, wherein the antenna further comprises one or more drivers configured to send current through the first trace and the second trace, and the PS circuitry varies the driving ratio between the first trace and the second trace by adjusting the current sent through the first trace and the second trace.

3. The apparatus of claim 1, wherein the one or more second magnetic field components are combined additively or subtractively with at least one of the one or more first magnetic field components to generate the magnetic field in the third direction.

4. The apparatus of claim 1, wherein the communication interface is configured to communicate with the charging device via at least one of Wi-Fi, Bluetooth, radio frequency identification (RFID), near-field communication (NFC), or a personal area network.

5. The apparatus of claim 1, wherein the apparatus is a charging station, and the charging station comprises a planar surface.

6. The apparatus of claim 1, wherein the apparatus is a charging station, and the charging station comprises a non-planar surface.

7. A device comprising:
power signal (PS) circuitry configured to wirelessly transfer energy to a charging device; and
an antenna comprising a plane of traces, the antenna configured to, when driven by the PS circuitry:
generate a first magnetic field component parallel to the plane of traces; and
generate a second magnetic field component parallel to the plane of traces,
wherein the second magnetic field component is oriented in a direction different from a direction of the first magnetic field component.

8. The device of claim 7, wherein an antenna plane of the charging device is oriented orthogonally to the plane of traces.

9. The device of claim 7, further comprising a transceiver configured to establish a communication link with the charging device via at least one of Wi-Fi, Bluetooth, radio frequency identification (RFID), near-field communication (NFC), or a personal area network.

10. The device of claim 9, wherein the transceiver is configured to receive a status or control message comprising a field coupling indicator for the charging device via the communication link.

11. The device of claim 10, wherein the PS circuitry is configured to adjust power signal parameters, detect new charging devices within a power signal range, determine a battery level or charging progress of the charging device, and determine when the charging device has completed charging using information in the status or control message.

12. The device of claim 7, wherein the PS circuitry is configured to determine a field coupling for the charging device by measuring a load of the antenna.

13. The device of claim 9, wherein the first magnetic field component, the second magnetic field component, and the third magnetic field component super-positioned to generate a magnetic field, wherein the PS circuitry is configured to cause the antenna to adjust current levels to vary a field direction or distribution of the magnetic field, until a predetermined charging level is reached using information received from the charging device via the communication link.

14. The device of claim 9, wherein the PS circuitry is configured to perform a search for a maximum for charging efficiency for the charging device using information received from the charging device via the communication link.

15. The device of claim 9, wherein the transceiver is configured to receive positioning data comprising at least one of location, orientation, or alignment from the charging device.

16. The device of claim 7, wherein:
the plane of traces comprises a plurality of macroblocks; and
the PS circuitry is configured to:
activate a first macroblock of the plurality of macroblocks; and
forgo activation of a second macroblock of the plurality of macroblocks when the first macroblock is coupled to an antenna of the charging device more strongly than the second macroblock.

17. A system comprising:
power signal (PS) circuitry configured to wirelessly transfer energy to one or more charging devices; and
an antenna comprising a plane of traces, the antenna configured to, when driven by the PS circuitry:
generate a first magnetic field component parallel to the plane of traces;
generate a second magnetic field component parallel to the plane of traces; and
generate a third magnetic field component normal to the plane of traces.

18. The system of claim 17, wherein the third magnetic field component is used to charge a charging device when an antenna plane of the charging device is oriented parallel to the plane of traces.

19. The system of claim 17, wherein the first magnetic field component and the second magnetic field component are used to charge a charging device when an antenna plane of the charging device is oriented orthogonally to the plane of traces.

20. The system of claim 17, wherein the plane of traces comprises first traces and second traces, the first traces, when driven, configured to generate the first magnetic field component parallel to the plane of traces, and the second traces, when driven, configured to generate the second magnetic field component parallel to the plane of traces.

21. The system of claim 20, wherein the antenna further comprises an antenna coil, which when driven, is configured to generate the third magnetic field component normal to the plane of traces.

22. The system of claim 21, wherein the first traces, the second traces, and the antenna coil are separated by insulation.

23. The system of claim 21, wherein the first traces are daisy-chained with the second traces or with both the second traces and the antenna coil.

\* \* \* \* \*